United States Patent [19]

Uzelmeier et al.

[11] 4,235,760

[45] Nov. 25, 1980

[54] ANTIPLASTICIZER FOR HIGH IMPACT POLYSTYRENE

[75] Inventors: Christopher W. Uzelmeier; Paul M. Coffman, both of Houston, Tex.

[73] Assignee: Shell Oil Company, Houston, Tex.

[21] Appl. No.: 42,386

[22] Filed: May 24, 1979

[51] Int. Cl.³ .............................................. C08L 91/06
[52] U.S. Cl. .................................. 260/28.5 B; 525/83; 525/84
[58] Field of Search .................. 260/28.5 B; 525/388, 525/76, 83, 84

[56] References Cited

U.S. PATENT DOCUMENTS

| | | | |
|---|---|---|---|
| 2,964,487 | 12/1960 | Chapman et al. | 260/23 S |
| 3,060,163 | 10/1962 | Erchak | 525/388 X |
| 3,256,365 | 6/1966 | Wolinski | 260/28.5 A |
| 3,488,743 | 1/1970 | Baer et al. | 525/243 |
| 3,506,740 | 4/1970 | Dempsey et al. | 525/193 |
| 4,042,551 | 8/1977 | Kruse | 260/28.5 B |

*Primary Examiner*—Lewis T. Jacobs
*Attorney, Agent, or Firm*—Dean F. Vance

[57] ABSTRACT

High impact polystyrene compositions having improved melt flow properties along with good heat resistance is obtained by incorporating about 0.5 to 10 percent by weight of an oxidized polyethylene material having a molecular weight of from about 500 to about 5,000 and an acid number of between about 5 and about 50.

9 Claims, No Drawings

ANTIPLASTICIZER FOR HIGH IMPACT POLYSTYRENE

BACKGROUND OF THE INVENTION

It is known that monoalkenyl aromatic polymers such as polystyrene have improved toughness when a small amount of a rubber polymer is incorporated therein. These rubber-modified compounds are resistant to breakage under impact and are consequently useful in making molded articles. High impact polystyrene is obtained, for example, by polymerizing a solution in styrene of a minor amount, one to fifteen parts by weight per hundred parts of styrene, of an unsaturated rubbery polymer of a conjugated diolefin, e.g., polybutadiene or a copolymer of styrene and butadiene. While high impact polystyrene possesses good mechanical properties such as impact strength, hardness, heat distortion temperature, other mechanical properties such as elongation and temperature-viscosity relationships are less than desirable for molding operations. These latter properties affect the rheological behavior of the product and, accordingly, its processability. It is known that certain additives, known as flow promoters, can be introduced into high impact polystyrene in order to give the desired properties of flow, prevent sticking to the mold, and the like. These additives, however, have a detrimental effect on other mechanical properties.

U.S. Pat. No. 3,506,740 discloses the use of amorphous polymers selected from amorphous, atactic low molecular weight polypropylene and polybutylene as flow promoters. Likewise, U.S. Pat. No. 4,042,551 discloses the use of certain polyethylene waxes as flow promoters. While these polymers have resulted in improved flow properties, their use has also resulted in a drop in heat resistance as measured by the Vicat temperature reading.

It has now been discovered that a certain oxidized polyethylene material when added as a flow promoter to a high impact polystyrene molding composition increases melt flow but does not reduce heat resistence.

SUMMARY OF THE INVENTION

The present invention relates to polymer blends having improved flow properties while retaining good heat resistence. The polymer blends comprise the following based on the total weight of the blend:

(a) about 80 to 98.5 percent by weight of a monoalkenyl aromatic polymer comprising at least one monoalkenyl aromatic monomer of the formula:

where Ar is selected from the group consisting of phenyl, halophenyl, alkylphenyl, alkylhalophenyl, and mixtures thereof, and X is selected from the group consisting of hydrogen, halogen, and an alkyl radical of less than three carbon atoms and mixtures thereof.

(b) about 1 to 15 percent by weight of a diene rubber moiety dispersed as grafted diene rubber particles, said rubber particles being grafted with and having occluded said monoalkenyl aromatic polymer, and (c) about 0.5 to 10 percent by weight of an oxidized polyethylene having a molecular weight of from about 500 to about 5,000 and an acid number of between about 5 and 50.

DETAILED DESCRIPTION OF THE INVENTION

The alkenyl aromatic polymer of the polyblend comprises at least one monoalkenyl aromatic monomer of the formula:

where Ar is selected from the group consisting of phenyl, halophenyl, alkylphenyl, alkylhalophenyl, and mixtures thereof, and X is selected from the group consisting of hydrogen, halogen, and an alkyl radical of less than three carbon atoms.

Exemplary of the monomers that can be employed in the present process are styrene, alphaalkyl monovinylidene monoaromatic compounds, e.g., alphamethylstyrene, alphaethylstyrene, alphamethylvinyltoluene, etc., ring substituted alkyl styrenes, e.g., vinyl toluene, o-ethylstyrene, p-ethylstyrene, 2,4-dimethylstyrene, etc., ring substituted halostyrenes, e.g., o-chlorostyrene, p-chlorostyrene, o-bromostyrene, 2,4-dichlorostyrene, etc., ring alkyl, ring halosubstituted styrenes, e.g., 2-chloro-4-methylstyrene, 2,6-dichloro-4-methylstyrene, etc. If so desired, mixtures of such monovinyldiene aromatic monomers may be employed. The preferred monomer is styrene.

The diene rubbers of the polyblend are any rubber polymer (a rubbery polymer having a second order transition temperature not higher than 0° C., preferably not higher than −20° C., as determined by ASTM D-746-52T) of one or more of the conjugated 1,3 dienes, e.g., butadiene, isoprene, 2-chloro-1,3 butadiene, 1-chloro-1,3 butadiene, cyclopentadiene. Such rubbers include copolymers and block copolymers of conjugated 1,3 dienes with one or more copolymerizable monoethylenically unsaturated monomers, such as monovinyldiene aromatic hydrocarbons (e.g., styrene, an aralkylstyrene, the arethylstyrenes, p-tertbutylstyrene, etc., an alphamethylstyrene, alphaethylstyrene, alphamethyl-p-methylstyrene, etc, vinyl naphthalene, etc.); arhalomonovinyldiene aromatic hydrocarbons (e.g., the o-, m-, and p-chlorostyrene, 2,4-dibromostyrene, 2-methyl-4-chlorostyrene, etc.); acrylonitrile, methacrylonitrile, alkyl acrylates (e.g., methylacrylate, butylacrylate, 2-ethylhexylacrylate, etc.); the corresponding alkyl methacrylates, acrylamides (e.g., acrylamide, methacrylamide, n-butylacrylamide, etc.); unsaturated ketones (e.g., vinylmethyl ketone, methylisopreneyl ketone, etc.); alphaolefins (e.g., ethylene, propylene, etc.), pyridines, vinyl esters (e.g., vinyl acetate, vinyl stearate, etc.); vinyl and vinyldiene halides (e.g., the vinyl and vinyldiene chlorides and vinyldiene chlorides and bormides, etc.); and the like.

A preferred group of rubbers are the sterospecific polybutadiene rubbers formed by the polymerization of 1,3-butadiene. These rubbers have a cis-isomer content of about 30–98 percent and a transisomer content of about 70–2 percent and generally contain at least about 85 percent of polybutadiene formed by 1,4 addition with no more than about 15 percent by 1,2 addition. Mooney viscosities of the rubber (ML-4, 212° F.) can range from about 20–70 with a second order transition temperature from about −50° to −105° C. as determined by ASTM D-746-52T.

The diene rubber can be grafted with the above described monoalkenyl aromatic monomers and can be prepared, e.g., by mass suspension polymerization methods such as that disclosed in U.S. Pat. No. 3,488,743. Those skilled in the art are aware that if one dissolves a diene rubber in the described monomers that during polymerization, the rubber forms a separate phase dissolved in monomer from the polymerized polystyrene/monomer phase. When the polymer/monomer phase becomes larger during polymerization, the rubber/monomer phase inverts and disperses as rubber/monomer droplets in the polymer/monomer phase. As the polymerizing mixture is completely polymerized, e.g., either by mass or suspension polymerization, the rubber/monomer droplets polymerize to discrete rubber particles dispersed in the polymer phase forming a polyblend of grafted rubber particles in the polymer phase. The rubber particles are found to be grafted with polymer molecules and also contain occluded polymer of the described monomers.

The polymeric polyblend comprises, based on the total weight of the polyblend, about 80 to 98 percent by weight of a monoalkenyl aromatic polymer, e.g., polystyrene, which includes that polymer in the matrix phase and that grafted and occluded in the diene rubber phase. It has been found most practical to prepare the monoalkenyl aromatic polymer and the grafted diene rubber polymer simultaneously as disclosed above by dissolving the diene rubber in the monoalkenyl aromatic monomer and polymerizing the monomer by mass polymerization forming these two components of the polyblend simultaneously. The range of rubber dissolved can range from 1 to 15 percent by weight preferably from 2.5 to 10 percent by weight of the polymerized polyblend.

The flow promoter used in the present invention are oxidized polyethylenes having an average molecular weight of about 500 to about 5,000 and an acid number between about 5 and about 50. Preferred molecular weight is between about 1,000 and about 2,500 and preferred acid numbers are between about 10 and about 30. Methods for producing such oxidized polyethylenes are well known in the art. Typical oxidized polyethylenes and their preparation are disclosed in U.S. Pat. Nos. 2,964,487 and 3,256,365, which patents are herein incorporated by reference. A commercially available oxidized polyethylene is Allied Chemical's AC-629A having an average molecular weight of 1,500–2,000 and an acid number of 15.

Preferably, the oxidized polyethylene flow promoter has a melting point equal to or greater than the glass transition temperature of the monoalkenyl aromatic polymer. Since the glass transition temperature for polystyrene is 100° C., it is preferred that the melting point of the oxidized polyethylene when used as a flow promoter for HIPS be greater than 100° C.

The amount of flow promoter employed in the molding composition is 0.5 to 10.0 percent by weight, preferably 1 to 5 percent by weight.

The oxidized polyethylenes employed herein are not considered to be lubricants or plasticizers for the matrix phase as the physical properties such as tensile strength are not impaired. They have been found to be compatible with the rubber phase of the polyblend and are believed to increase the deformation of the rubber phase overcoming the filler effect of the crosslinked rubber increasing the melt flow of the polyblend and the elongation of the polyblend at the Tg of the matrix polymer phase which is particularly important in sheet forming applications. Unexpectedly, the use of the oxidized polyethylenes does not result in a decline of heat resistance as does the use of polyethylene waxes and other flow promoters.

To more fully illustrate and describe the invention, the following illustrative embodiments are given. For purposes of illustration, high impact polystyrene (HIPS) is used as the molding composition. It is understood, however, that the invention is not limited thereto, and that other monoalkenyl aromatic polymeric materials are also suitable.

ILLUSTRATIVE EMBODIMENT I

In Illustrative Embodiment I, various materials were mixed with a standard HIPS material on a Banbury mixer and composite were screened for melt flow, Vicat and Izod impact strength. The HIPS employed was prepared by the mass polymerization of styrene monomer in the presence of about 8 percent by weight medium cis polybutadiene rubber. Run 1 gives the results with no addition of flow promoters. Runs 2 through 9 give the results when 3 parts by weight of the flow promoter is added to 97 parts by weight of the HIPS. The results are presented below in Table 1:

TABLE 1

| RUN | FLOW PROMOTER, 3% IN HIPS | | COMPOSITE PROPERTIES | | |
|---|---|---|---|---|---|
| | TRADE NAME | DESCRIPTION | MELT FLOW G/10 MIN. | VICAT °F. | IZOD CM |
| | | Control | 4.0 | 208 | 1.67 |
| 1 | Kaydol 350 | mineral oil | 5.3 | 201 | 1.69 |
| 2 | Piccolastic D-100 | oligomeric polystyrene | 6.9 | 199 | 1.55 |
| 3 | AFAX-500-HLO | atactic polypropylene | 6.6 | 208 | 1.24 |
| 4 | DC-200 | silicone fluid | 4.1 | 208 | 1.46 |
| 5 | H-1500 | polyisobutylene | 4.1 | 208 | 1.52 |
| 6 | AC-617 | low M.W. polyethylene (M.P. 215° F.) | 13.7 | 201 | 1.20 |
| 7 | AC-9 | low M.W. polyethylene (M.P. 243° F.) | 11.5 | 203 | 1.07 |
| 8 | AC-629A | oxidized polyethylene (M.P. 219° F., acid number 15) | 9.2 | 208 | 1.34 |
| 9 | AC-400 | ethylene/vinylacetate copolymer | 14.6 | 201 | 1.06 |

The best balance of properties was obtained in Run 8 with the oxidized polyethylene flow promoter. As shown by comparing Run 1 to Run 8, the melt flow was improved from 4.0 to 9.2 at no loss in Vicat temperatures. By comparison, the low molecular weight polyethylenes employed in Runs 6 and 7 resulted in Vicat temperature reductions of 7° F. and 5° F., respectively. In addition, the Izod impact strength for Run 8 was better than that for Runs 6 and 7.

ILLUSTRATIVE EMBODIMENT II

In Illustrative Embodiment II, AC-629A oxidized polyethylene was added at two levels to a high heat impact polystyrene. The results shown in Table 2 below show the significant change in melt index obtained without sacrificing heat resistence:

TABLE 2

| OXIDIZED | HIPS PROPERTIES | | |
|---|---|---|---|
| PE AC-629, % w: | 0 | 1.5 | 3.0 |
| melt index | 3.2 | 6.1 | 9.3 |
| Vicat, °F. | 216 | 216 | 215 |
| heat distortion temp., °F. (annealed) | 195 | | 194 |
| ¼" IM tensile strength, psi | 3,550/3,700 | 3,380//3,660 | 3,490/3,780 |
| ¼" IM elongation, % | 42 | 46 | 38 |
| ¼" IM Izod, ft lb/in | 1.38 | 1.24 | 1.11 |
| ¼" IM flexural strength, psi | 7,200 | 6,660 | 6,530 |
| ¼" IM flexural modulus, psi | $2.85 \times 10^5$ | $2.67 \times 10^5$ | $2.77 \times 10^5$ |

ILLUSTRATIVE EMBODIMENT III

In Illustrative Embodiment III, various levels of AC-629A oxidized polyethylenes were mixed with a HIPS. The results shown below in Table 3 surprisingly indicates an increase in Vicat reading along with a significant increase in melt index:

TABLE 3

| RUN NO. | WEIGHT PERCENT AC-629A | MELT INDEX | VICAT, °F. |
|---|---|---|---|
| 13 | 0 | 2.77 | 212 |
| 14 | 0.5 | 2.64 | 214 |
| 15 | 1.0 | 2.83 | 216 |
| 16 | 3.0 | 5.23 | 212 |
| 17 | 5.0 | 12.41 | 212 |

We claim as our invention:

1. A polymeric polyblend having high melt flow and high heat resistance comprising, based on the total weight of the polyblend:

(a) about 80 to 98.5 percent by weight of a monoalkenyl aromatic polymer comprising at least one monoalkenyl aromatic monomer of the formula:

where Ar is selected from the group consisting of phenyl, halophenyl alkylphenyl, alkylhalophenyl, and mixtures thereof, and X is selected from the group consisting of hydrogen, halogen, and an alkyl radical of less than three carbon atoms and mixtures thereof, (b) about 1 to 15 percent by weight of a diene rubber moiety dispersed as grafted diene rubber particles, said rubber particles being grafted with and having occluded said monoalkenyl aromatic polymer, and (c) about 0.5 to 10 percent by weight of an oxidized polyethylene having a molecular weight of from about 500 to about 5,000 and an acid number of between about 5 and 50.

2. The polyblend of claim 1 wherein said monoalkenyl aromatic monomer is styrene.

3. The polyblend of claim 1 wherein said diene rubber is selected from the group consisting of polybutadiene, polyisoprene, polychloroprene, and butadiene-styrene polymers, butadiene-acrylonitrile copolymers, butadiene-alphamethylstyrene copolymers, or mixtures thereof.

4. The polyblend of claim 3 wherein said rubber is polybutadiene.

5. The polyblend of claims 1 or 2 wherein said diene rubber is a sterospecific polybutadiene rubber having a cis-isomer content of about 30-98 percent, a trans-isomer content of about 70-2 percent, Mooney viscosity of about 20° to 70° (ML-4 212° F.), at least about 85 percent of polybutadiene formed by 1,4 addition with no more than 15 percent 1,2 addition, and a Tg range from about −50° to −105° C.

6. The polyblend of claim 1 wherein the average molecular weight of said oxidized polyethylene is between about 1,000 and about 2,500.

7. The polyblend of claim 1 wherein the acid number of said oxidized polyethylene is between about 10 and 30.

8. The polyblend of claim 1 wherein the melting point temperature of said oxidized polyethylene is equal to or greater than the glass transition temperature of said monoalkenyl aromatic polymer.

9. The polyblend of claim 2 wherein the melting point temperature of said oxidized polyethylene is greater than about 100° C.